US011884087B2

(12) United States Patent
Bizen

(10) Patent No.: US 11,884,087 B2
(45) Date of Patent: Jan. 30, 2024

(54) TAPE CARTRIDGE

(71) Applicant: SEIKO EPSON CORPORATION, Tokyo (JP)

(72) Inventor: Mizuki Bizen, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 144 days.

(21) Appl. No.: 17/560,946

(22) Filed: Dec. 23, 2021

(65) Prior Publication Data

US 2022/0203737 A1 Jun. 30, 2022

(30) Foreign Application Priority Data

Dec. 24, 2020 (JP) ................................ 2020-215374
May 26, 2021 (JP) ................................ 2021-088708

(51) Int. Cl.

| | |
|---|---|
| ***B41J 3/407*** | (2006.01) |
| ***B41J 15/04*** | (2006.01) |
| ***B41J 32/00*** | (2006.01) |
| ***B41J 32/02*** | (2006.01) |
| *B41J 2/32* | (2006.01) |
| *B41J 17/32* | (2006.01) |

(52) U.S. Cl.

CPC ............ *B41J 32/02* (2013.01); *B41J 3/4075* (2013.01); *B41J 15/04* (2013.01); *B41J 15/044* (2013.01); *B41J 32/00* (2013.01); *B41J 2/32* (2013.01); *B41J 17/32* (2013.01)

(58) Field of Classification Search

CPC . B41J 32/02; B41J 3/4075; B41J 15/04; B41J 15/044; B41J 32/00; B41J 2/32; B41J 17/32

See application file for complete search history.

(56) References Cited

U.S. PATENT DOCUMENTS

| | | | | |
|---|---|---|---|---|
| 2008/0003043 | A1 | 1/2008 | Fukui et al. | |
| 2015/0283836 | A1 | 10/2015 | Sakano et al. | |
| 2016/0236495 | A1 | 8/2016 | Sakano et al. | |
| 2018/0037043 | A1 | 2/2018 | Sakano et al. | |
| 2018/0079238 | A1* | 3/2018 | Kubota .................. | B41J 3/4075 |
| 2019/0030935 | A1 | 1/2019 | Sakano et al. | |
| 2020/0147988 | A1 | 5/2020 | Sakano et al. | |
| 2020/0269612 | A1* | 8/2020 | Tokuda .................... | B41J 11/70 |

FOREIGN PATENT DOCUMENTS

| | | | | |
|---|---|---|---|---|
| JP | H08-238809 | A | 9/1996 | |
| JP | 2002355907 | A * | 12/2002 | ............... B31D 1/02 |
| JP | 2006-206209 | A | 8/2006 | |
| JP | 2016-187922 | A | 11/2016 | |
| KR | 20180099947 | A | 9/2018 | |

* cited by examiner

*Primary Examiner* — Yaovi M Ameh
(74) *Attorney, Agent, or Firm* — Oliff PLC

(57) ABSTRACT

A tape cartridge includes: a tape-like member including a tape body having a first edge located in a first direction, which is one side in a width direction of the tape body, and a detection projection portion projecting in the first direction from the first edge so as to be detected by the detecting portion and having a detection end at an end thereof in the first direction; a guide portion that guides feeding of the tape-like member such that the tape-like member curves along a peripheral surface of a platen roller for feeding the tape-like member; and a contact portion that makes contact with the detection end at a position where the tape-like member curves along the peripheral surface of the platen roller.

7 Claims, 14 Drawing Sheets

TAPE CARTRIDGE

The present application is based on, and claims priority from JP Application Serial Number 2020-215374, filed Dec. 24, 2020 and JP Application Serial Number 2021-088708, filed May 26, 2021, the disclosures of which are hereby incorporated by reference herein in their entirety.

BACKGROUND

1. Technical Field

The present disclosure relates to a tape cartridge to be attached to a tape printing device.

2. Related Art

JP-A-2016-187922 discloses a known tape cartridge having a label tape including a tape body and detection projection portions projecting in a first direction from a first edge of the tape body. The detection projection portions are detected by a light sensor provided on a tape printing device.

When this tape cartridge has a contact portion, which makes contact with a detection end (i.e., an end of a detection projection portion in the first direction), the detection end makes contact with the contact portion, potentially bending the detection projection portion.

SUMMARY

According to an aspect of the present disclosure, a tape cartridge to be attached to a tape printing device having a detecting portion includes: a tape-like member including a tape body having a first edge located in a first direction, which is one side in a width direction of the tape body, and a detection projection portion projecting in the first direction from the first edge so as to be detected by the detecting portion and having a detection end at an end thereof in the first direction; a guide portion that guides feeding of the tape-like member such that the tape-like member curves along a peripheral surface of a platen roller for feeding the tape-like member; and a contact portion that makes contact with the detection end at a position where the tape-like member curves along the peripheral surface of the platen roller.

DESCRIPTION OF EXEMPLARY EMBODIMENTS

Referring to the attached drawings, a tape cartridge 101, which is a first embodiment of a tape cartridge, will be described. The tape cartridge 101 is removably attached to a tape printing device 1. Although directions according to the XYZ orthogonal coordinate system, indicated in each drawing, will be used in the description below, such directions are only for ease of explanation and will not limit the embodiments below.

Tape Cartridge

Figure 1:
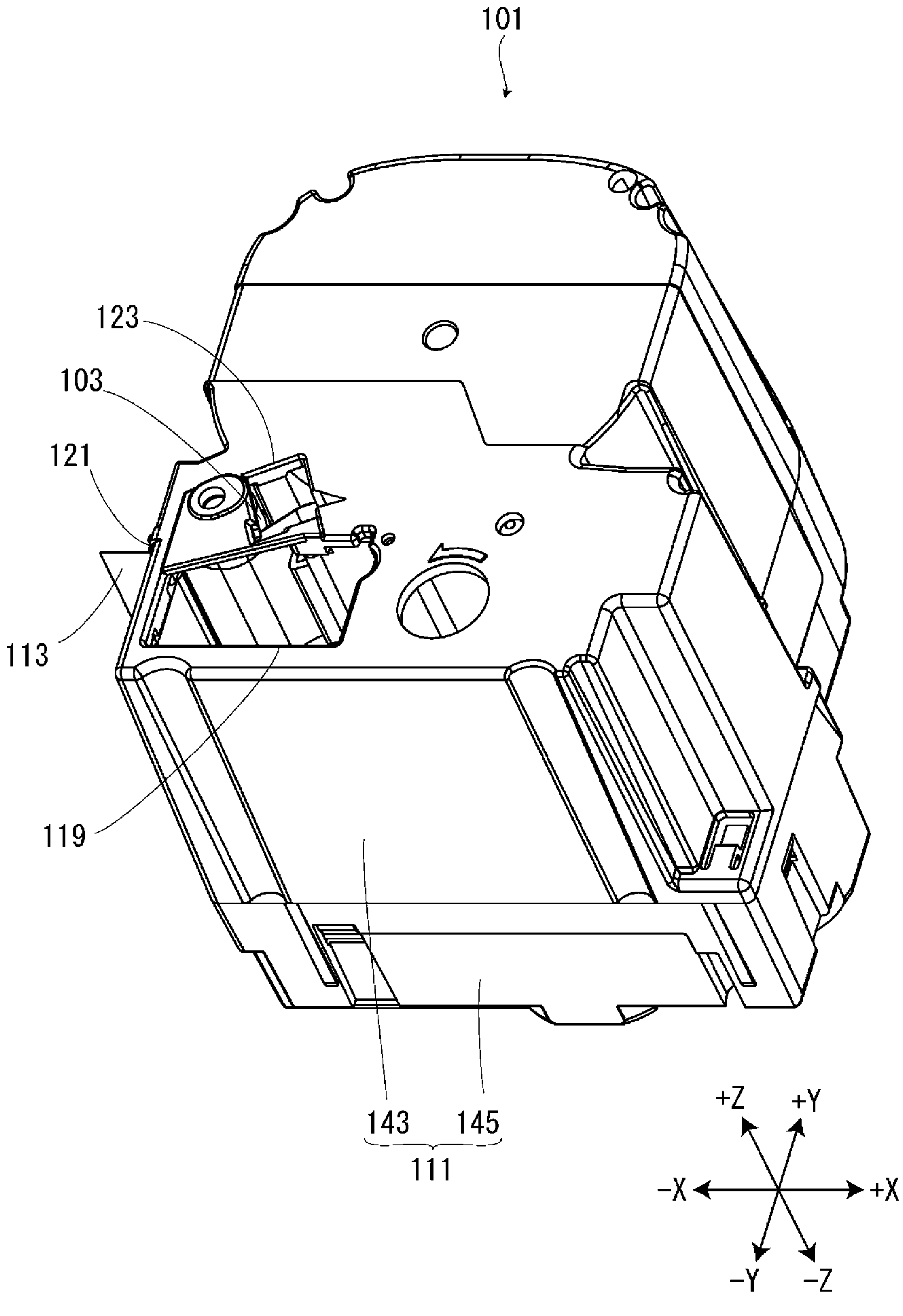
FIG. 1 is a perspective view of a tape cartridge according to a first embodiment.
Figure 2:
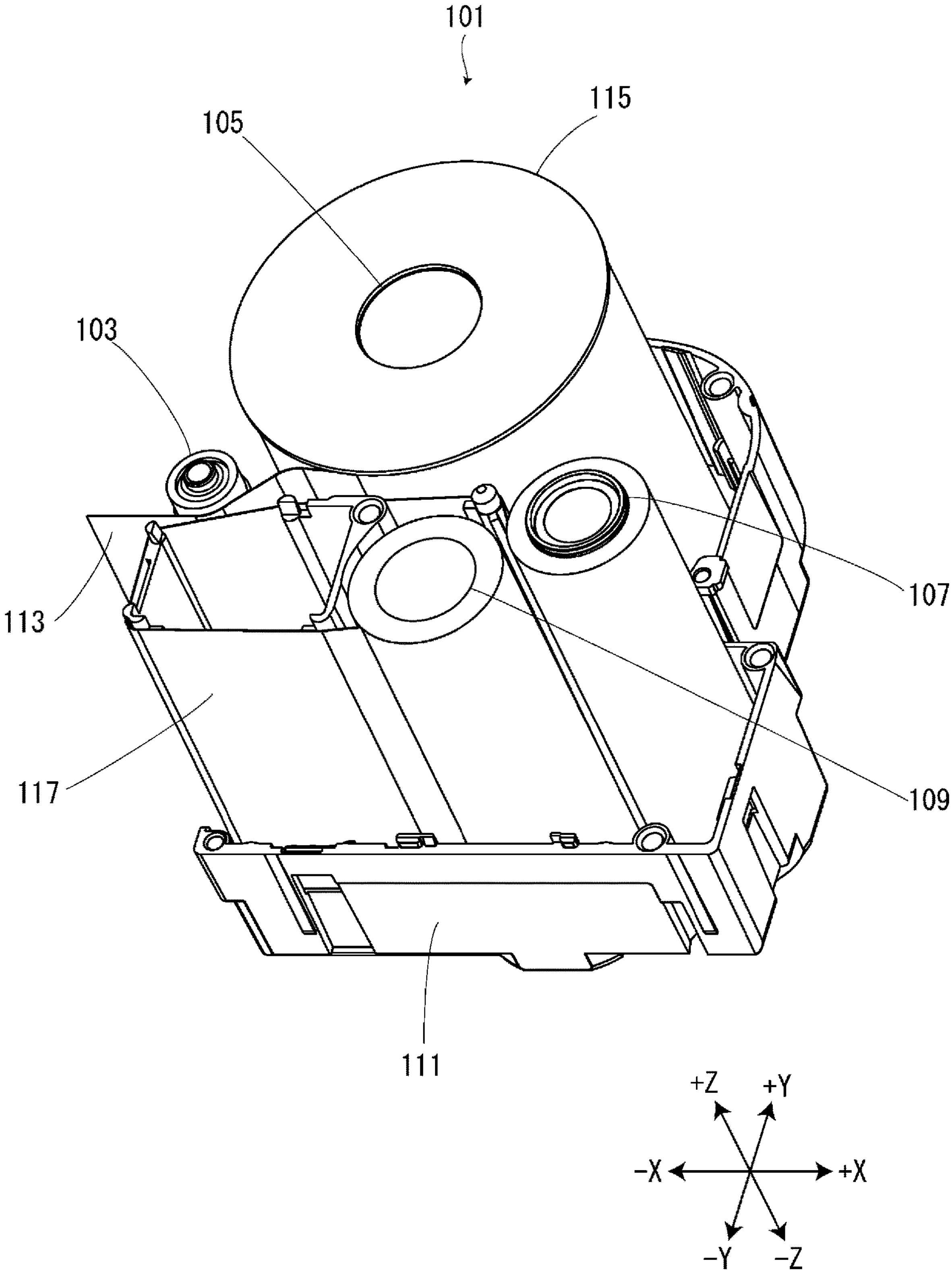
FIG. 2 is a perspective view of the tape cartridge without a first case.

As shown in FIGS. 1 and 2, the tape cartridge 101 includes a platen roller 103, a tape core 105, a feeding core 107, a winding core 109, and a cartridge case 111 accommodating these portions.

Figure 9:
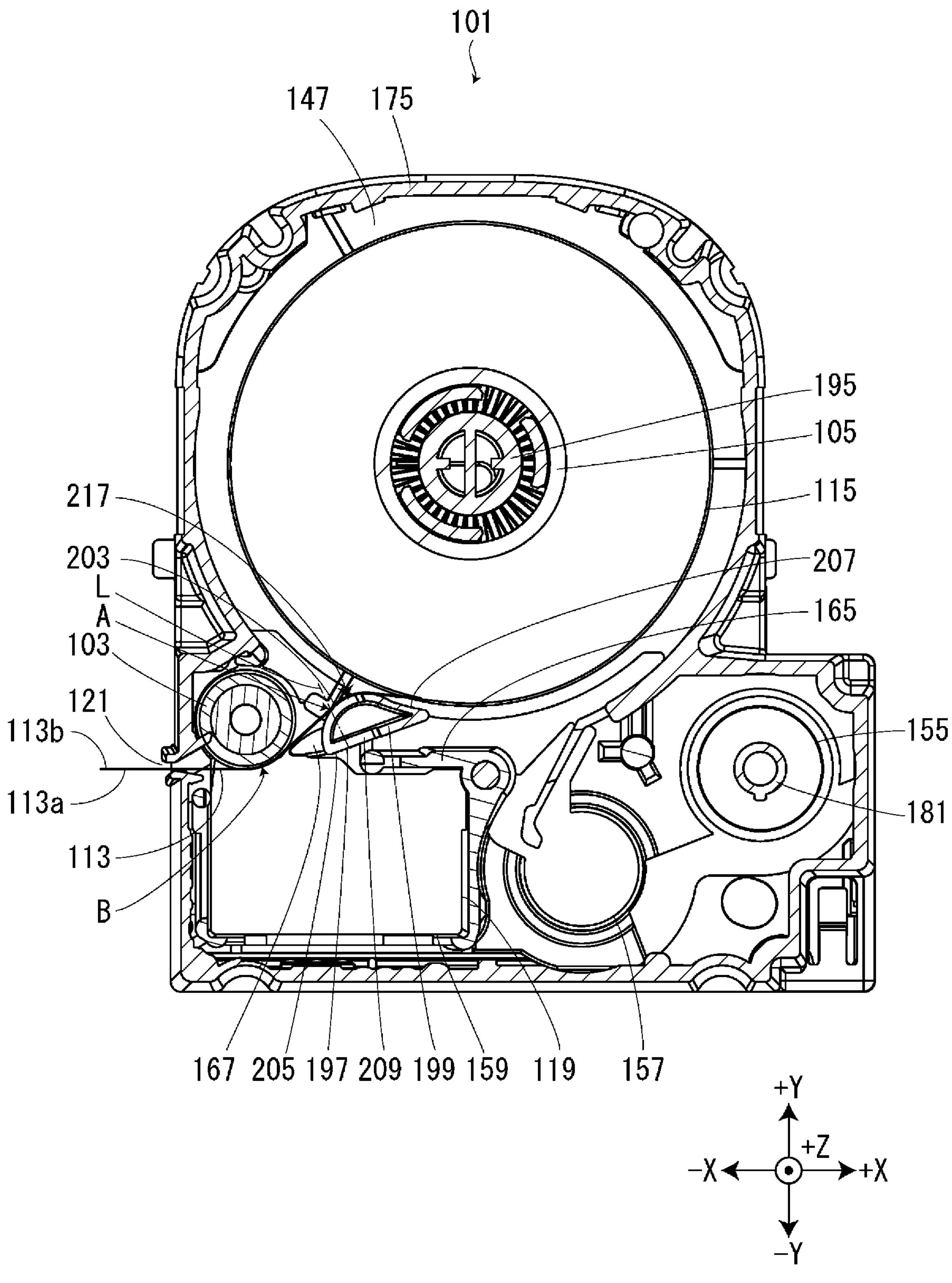
FIG. 9 is a sectional view of the tape cartridge taken at a plane parallel to an XY plane when the diameter of a tape roll is maximum.

A tape-like member 113 is wound around the tape core 105. The tape core 105 and the tape-like member 113 wound therearound is called a tape roll 115. As shown in FIG. 9, of the two sides of the tape-like member 113, the side on the outer circumferential side of the tape roll 115 is called a first tape side 113*a*, and the side on the inner circumferential side of the tape roll 115 is called a second tape side 113*b*.

Figure 4:
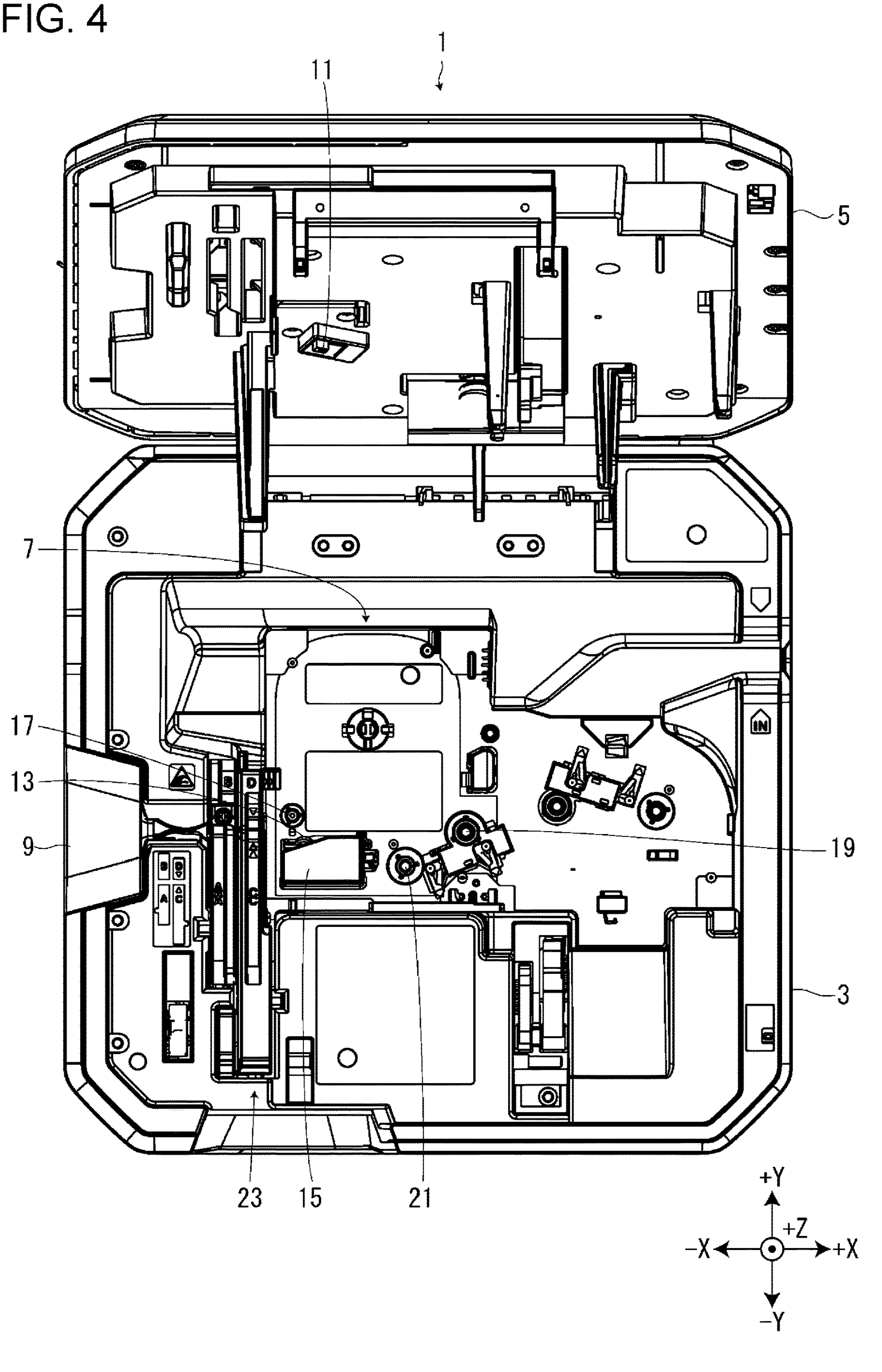
FIG. 4 shows a tape printing device as viewed from the +Z side.

An ink ribbon 117 is wound around the feeding core 107. The ink ribbon 117 fed from the feeding core 107 is wound around the winding core 109. The platen roller 103 feeds the tape-like member 113 and the ink ribbon 117 nipped between itself and a thermal head 13 provided on the tape printing device 1 (see FIG. 4). The cartridge case 111 has a head insertion hole 119 penetrating in the Zaxis, through which the thermal head 13 and a head cover 15 pass. The cartridge case 111 has a cartridge-side tape output port 121 in the −X-side face thereof. The tape-like member 113 fed from the tape roll 115 is output from the cartridge-side tape output port 121. The cartridge case 111 also has a detection opening 123 in the +Z-side face thereof, near the platen roller 103. A detecting portion 11 provided in the tape printing device 1, as shown in FIG. 4, is positioned in the detection opening 123.

Tape-Like Member

Figure 3:
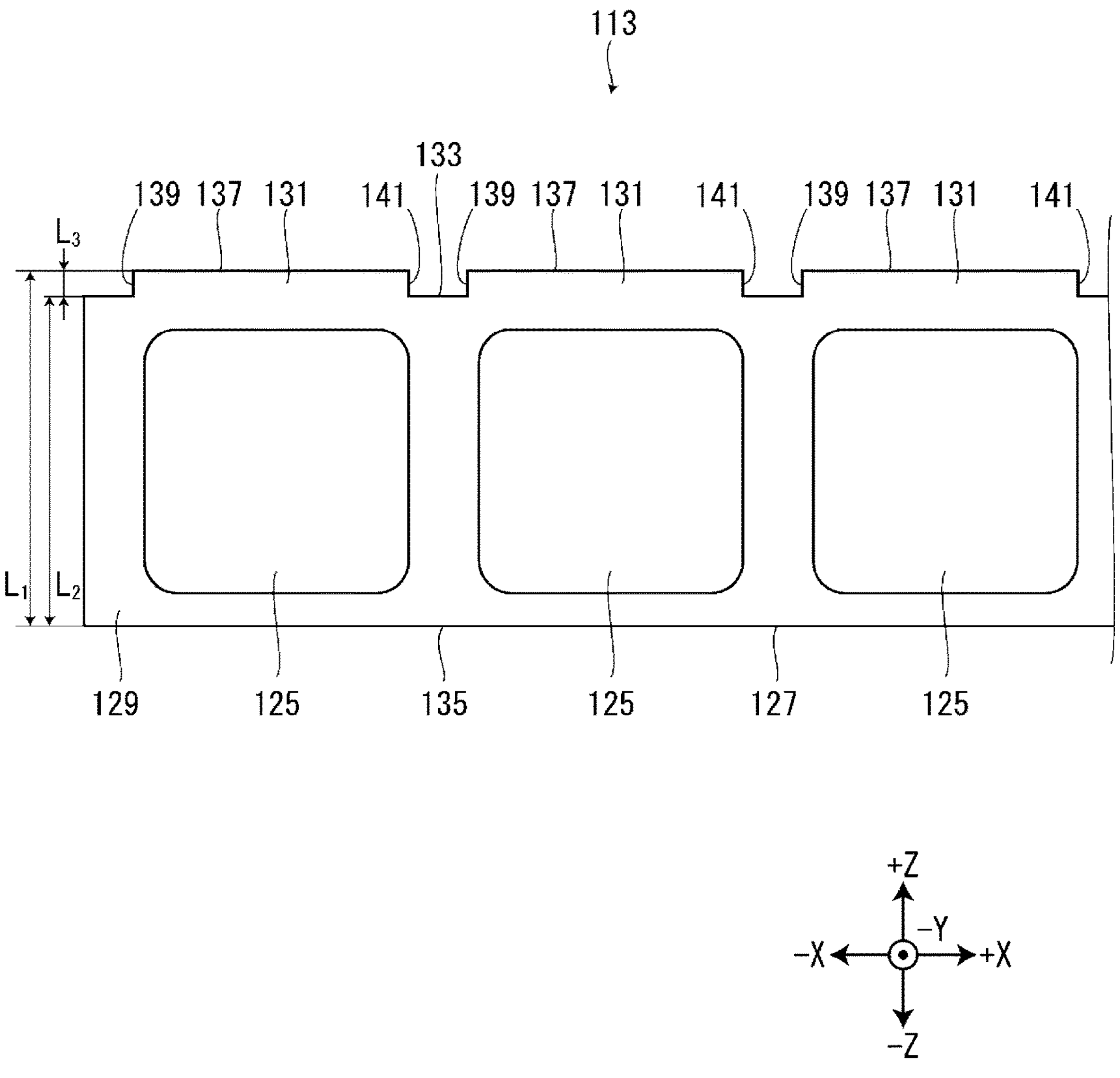
FIG. 3 shows a tape-like member.

As shown in FIG. 3, the tape-like member 113 includes multiple labels 125 and a liner tape 127.

The multiple labels 125 are stuck in a peelable manner to the first tape side 113*a* of the liner tape 127 at substantially equal intervals in the X axis, that is, in the length direction of the tape-like member 113. The tape printing device 1 prints printing images on the labels 125. Although the labels 125 have a rounded-square shape, the shape of the labels 125 is not limited thereto and may be, for example, circular, elliptical, polygonal, or a shape formed by combining these shapes.

The liner tape 127 includes a tape body 129 and multiple detection projection portions 131.

The tape body 129 has a ribbon shape. Of the edges of the tape body 129 in the width direction of the tape body 129, that is, in the width direction of the tape-like member 113, the edge located on the +Z-side is called a first edge 133, and the edge located on the −Z-side is called a second edge 135. The labels 125 are stuck to the tape body 129 in the liner tape 127.

The detection projection portions 131 project in the +Z direction from the first edge 133. The detection projection portions 131 are formed in a substantially rectangular shape extending in the length direction of the tape-like member 113. The detection projection portions 131 are provided at substantially equal intervals in the length direction of the tape-like member 113. The detection projection portions 131 are portions to be detected by the detecting portion 11 and correspond one-to-one to the labels 125. More specifically, the detection projection portions 131 are provided at predetermined positions with respect to the corresponding labels 125 in the length direction of the tape-like member 113. The tape printing device 1 prints a printing image on the label 125 corresponding to the detected detection projection portion 131 based on the result of detecting the detection projection portion 131.

The +Z-side ends of the detection projection portions 131 are called detection ends 137. The −X-side ends of the detection projection portions 131 are called first detection-target portions 139, and the +X-side ends of the detection projection portions 131 are called second detection-target portions 141. More specifically, of the ends of the detection projection portions 131 in the length direction of the tape-like member 113, the ends closer to the feeding leading end of the tape-like member 113 are called the first detection-target portions 139, and the ends farther from the feeding leading end of the tape-like member 113 are called the second detection-target portions 141.

The first tape dimension $L_1$, which is the dimension of the tape-like member 113 in the width direction of the tape-like member 113, is, for example, 54 mm, although not specifically limited thereto. The second tape dimension $L_2$, which is the dimension of the tape body 129 in the width direction of the tape-like member 113, is, for example, 50 mm, although not specifically limited thereto. The third tape dimension $L_3$, which is the dimension of the detection projection portions 131 in the width direction of the tape-like member 113, is, for example, 4 mm, although not specifically limited thereto.

Tape Printer

As shown in FIG. 4, the tape printing device 1 includes a device case 3 and an attaching-portion cover 5. The device case 3 has a substantially rectangular parallelepiped shape. The device case 3 has a cartridge mounting portion 7 in the +Z-side face thereof. The cartridge mounting portion 7 is a recess that is open on the +Z-side. The tape cartridge 101 is removably attached to the cartridge mounting portion 7.

The device case 3 has a device-side tape output port 9 in the −X-side face thereof. The tape-like member 113 fed out from the tape cartridge 101 attached to the cartridge mounting portion 7 is output from the device-side tape output port 9.

The attaching-portion cover 5 is pivotably attached to the +Y-side end of the device case 3 and exposes or covers the cartridge mounting portion 7. The detecting portion 11 is provided on the inner face of the attaching-portion cover 5. When the tape cartridge 101 is attached to the cartridge mounting portion 7, and the attaching-portion cover 5 is closed, the detecting portion 11 enters the detection opening 123 in the cartridge case 111 to detect a detection projection portion 131 exposed from the detection opening 123. The detecting portion 11 may be, for example, a photo-interrupter, which includes a light emitting element and a light receiving element.

The thermal head 13 and the head cover 15 are provided in the cartridge mounting portion 7. The thermal head 13 includes a heat-generating element (not shown) and performs printing on a label 125 of the tape-like member 113. The head cover 15 partially covers the thermal head 13. When the tape cartridge 101 is attached to the cartridge mounting portion 7, the thermal head 13 and the head cover 15 pass through the head insertion hole 119. A platen shaft 17, a feeding shaft 19, and a winding shaft 21 project in the +Z direction from the bottom surface of the cartridge mounting portion 7. When the tape cartridge 101 is attached to the cartridge mounting portion 7, the platen shaft 17, the feeding shaft 19, and the winding shaft 21 pass through the platen roller 103, the feeding core 107, and the winding core 109, respectively. As a result, the rotation of a feed motor (not shown) can be transmitted to the platen roller 103, the feeding core 107, and the winding core 109.

A cutter 23 is provided between the cartridge mounting portion 7 and the device-side tape output port 9. The cutter 23 is driven by a cutter motor (not shown) and cuts the tape-like member 113.

Once the tape cartridge 101 is attached to the cartridge mounting portion 7, and the attaching-portion cover 5 is closed, a head moving mechanism (not shown) moves the thermal head 13 toward the platen roller 103. As a result, the tape-like member 113 and the ink ribbon 117 are nipped between the thermal head 13 and the platen roller 103. In other words, the thermal head 13 presses the tape-like member 113 against the platen roller 103. In this state, the tape printing device 1 performs print processing based on the printing data generated from text and the like input to the tape printing device 1 or the printing data transmitted from an external device, such as a personal computer, to the tape printing device 1.

More specifically, in the tape printing device 1, the feed motor rotates the platen roller 103 and the winding core 109 to feed the tape-like member 113, fed from the tape roll 115, to the device-side tape output port 9 and to feed the ink ribbon 117, fed from the feeding core 107, to the winding core 109. At this time, the tape printing device 1 prints, on a label 125, a printing image based on the printing data by heating the thermal head 13. Furthermore, the tape printing device 1 cuts the liner tape 127 with the cutter 23, driven by a cutter motor, at a position behind the printed label 125, that is, at a +X-side position of the printed label 125. The tape printing device 1 can also draw the tape-like member 113 back into the cartridge case 111 and rewind the ink ribbon 117 on the feeding core 107 by rotating the platen roller 103 and the feeding core 107 with the feed motor.

The tape printing device 1 performs this print processing based on the result of detecting the detection projection portion 131 with the detecting portion 11. More specifically, in the tape printing device 1, after the first detection-target portion 139 of a detection projection portion 131 is detected, the tape-like member 113 is fed by a predetermined dimension, and printing on the label 125 is started at that position. After the second detection-target portion 141 of the detection projection portion 131 is detected, the tape printing device 1 feeds the tape-like member 113 by a predetermined dimension and cuts the liner tape 127 at that position.

Cartridge Case

As shown in FIG. 1, the cartridge case 111 includes a first case 143 and a second case 145. The first case 143 and the second case 145 are assembled in a separable manner. The tape cartridge 101 is attached to the cartridge mounting portion 7 such that the first case 143 is on the near side, i.e., on the +Z-side, and the second case 145 is on the far side, i.e., on the −Z-side.

Figure 5:
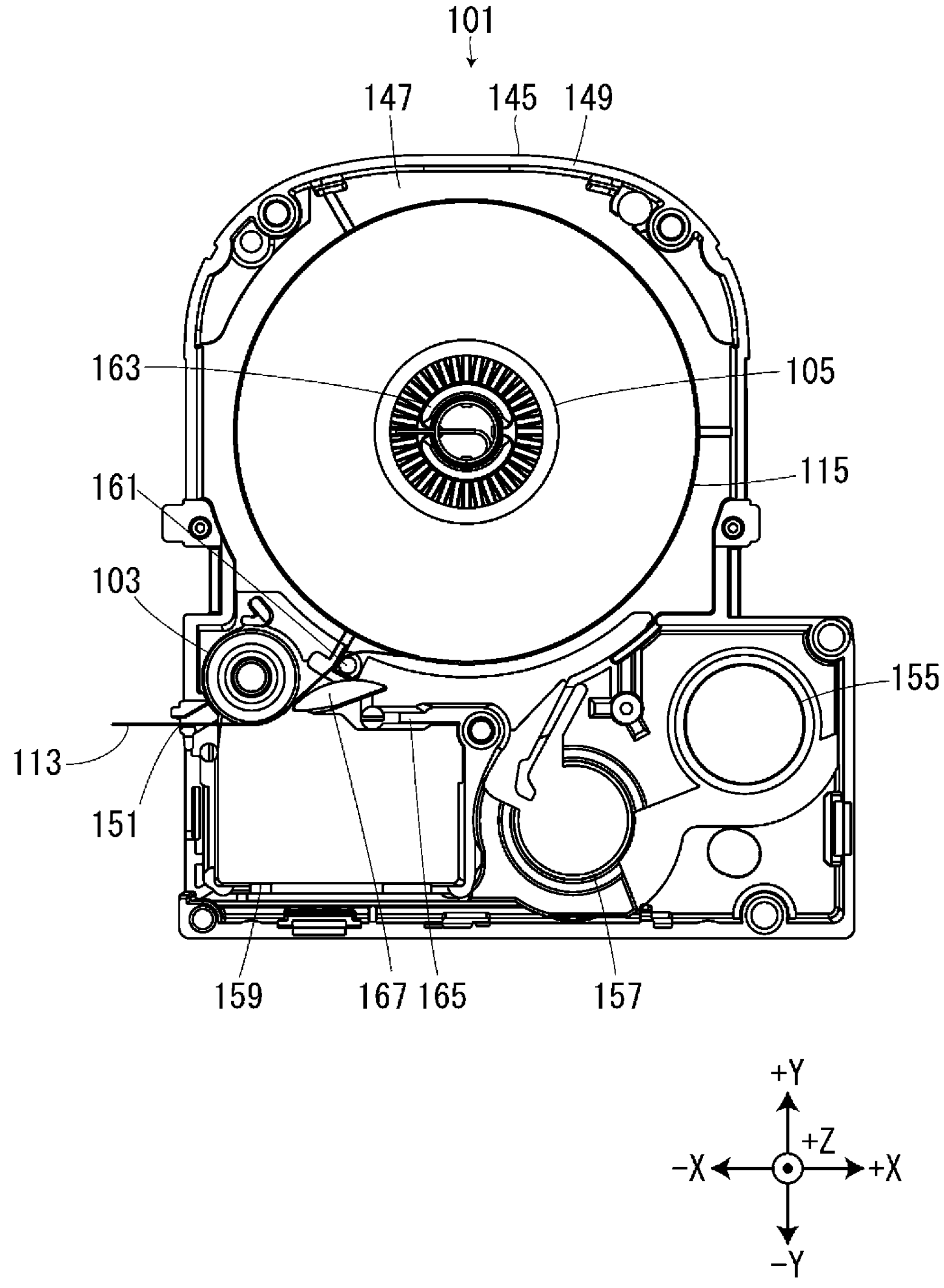
FIG. 5 shows the tape cartridge without the first case as viewed from the +Z side.

As shown in FIG. 5, the second case 145 includes a second base wall 147 and a second peripheral wall 149 projecting in the +Z direction from the periphery of the second base wall 147.

The second peripheral wall 149 has a second output port 151 near the −X and +Y corner of a second head opening 159 (described below). The second output port 151 is a slit extending in the Z direction.

The second base wall 147 has a second platen engaging hole 153 (see FIG. 11), a second feeding-core engaging hole 155, and a second winding-core engaging hole 157. The second platen engaging hole 153, the second feeding-core engaging hole 155, and the second winding-core engaging hole 157 are engaged with the −Z-side end of the platen roller 103, the −Z-side end of the feeding core 107, and the −Z-side end of the winding core 109, respectively. The second platen engaging hole 153 has a substantially elliptical shape extending in a pull-back direction so as to allow the platen roller 103 to move in the pull-back direction when the tape-like member 113 is pulled back. The pull-back direction is a direction between the +X direction and the +Y direction. The second base wall 147 has the second head opening 159. The second head opening 159 is the −Z-side end of the head insertion hole 119. The second base wall 147 has a guide engaging hole 161 to the +Y-side of a pull-back preventing portion 167 (described below).

A second tape-core shaft 163, a ribbon guide wall 165, and the pull-back preventing portion 167 project in the +Z direction from the second base wall 147.

The second tape-core shaft 163 is inserted into the tape core 105. The ribbon guide wall 165 is provided at an edge of the second head opening 159. The ribbon guide wall 165 guides the ink ribbon 117 fed from the feeding core 107 to the platen roller 103. More specifically, the ink ribbon 117 fed from the feeding core 107 is transported to the platen roller 103 through the space between: the ribbon guide wall 165; and the pull-back preventing portion 167 and a guide base end 199 (described below).

The pull-back preventing portion 167 is located to the +X-side of the platen roller 103 with the tape-like member 113 therebetween. When the tape-like member 113 is pulled back into the cartridge case 111 while the tape cartridge 101 is not attached to the cartridge mounting portion 7, the pull-back preventing portion 167 nips the tape-like member 113 between itself and the platen roller 103 that has moved in the pull-back direction as the tape-like member 113 is pulled. This way, the leading end of the tape-like member 113 is inhibited from being pulled back into the cartridge case 111.

Figure 6:
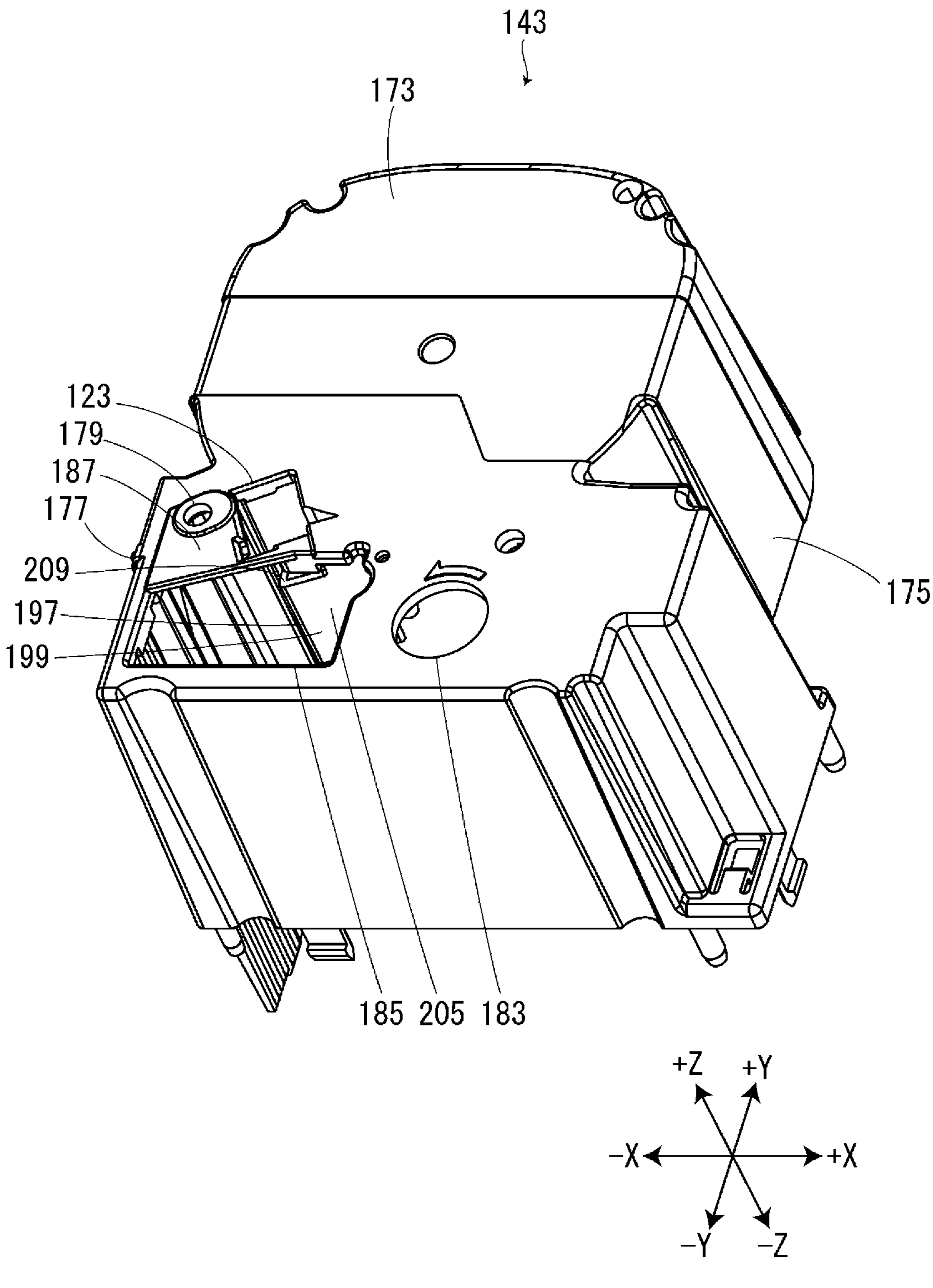
FIG. 6 is a perspective view of the first case.
Figure 7:
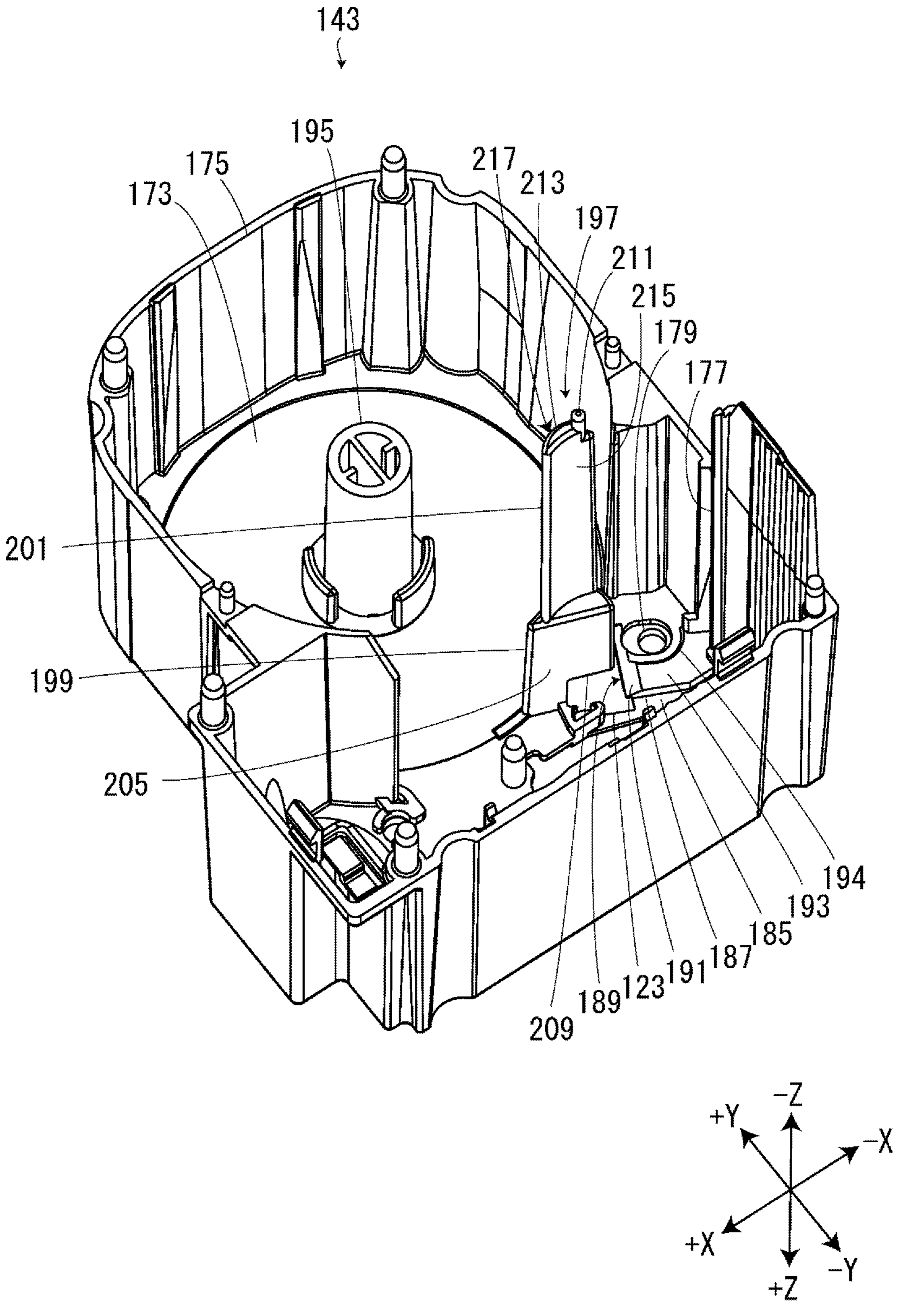
FIG. 7 is a perspective view of the first case as viewed from an angle different from the angle in FIG. 6.

As shown in FIGS. 6 and 7, the first case 143 includes a first base wall 173 and a first peripheral wall 175 projecting in the −Z direction from the periphery of the first base wall 173.

The first peripheral wall 175 has a first output port 177 near the −X and +Y corner of a first head opening 185 (described below). The first output port 177 is a slit extending in the Z direction. The first output port 177 and the second output port 151 are aligned with each other to form a cartridge-side tape output port 121.

The first base wall 173 has a first platen engaging hole 179, a first feeding-core engaging projection 181 (shown in FIG. 9), and a first winding-core engaging hole 183. The first platen engaging hole 179, the first feeding-core engaging projection 181, and the first winding-core engaging hole 183 are engaged with the +Z-side end of the platen roller 103, the +Z-side end of the feeding core 107, and the +Z-side end of the winding core 109, respectively. Similarly to the second platen engaging hole 153, the first platen engaging hole 179 has a substantially elliptical shape extending in a pull-back direction so as to allow the platen roller 103 to move in the pull-back direction when the tape-like member 113 is pulled back. The first base wall 173 has the first head opening 185. The first head opening 185 is the +Z-side end of the head insertion hole 119.

The first base wall 173 has the detection opening 123 to the +X-side of the first platen engaging hole 179.

In the first base wall 173, a portion between the detection opening 123 and the first output port 177 is called an intermediate portion 187. The intermediate portion 187 is also a portion between the first platen engaging hole 179 and the first head opening 185. The inner face, that is, the −Z-side face, of the intermediate portion 187 serves as a contact portion 189. The contact portion 189 makes contact with the detection end 137 of the detection projection portion 131 when the tape-like member 113 is fed from the tape roll 115 to the cartridge-side tape output port 121 (see FIG. 11). Because the detection end 137 makes contact with the contact portion 189, the tape-like member 113 does not meander or move obliquely in the +Z direction.

The contact portion 189 includes a slope portion 191 and a planar portion 193. The slope portion 191 is provided at the +X-side end of the contact portion 189 and corresponds to the edge of the detection opening 123. The slope portion 191 is inclined such that the −X-side end thereof is located further on the −Z-side than the +X-side end thereof. When the tape-like member 113 is fed from the tape roll 115 to the cartridge-side tape output port 121, the slope portion 191 guides the detection projection portion 131 that has passed through the detection opening 123 to the planar portion 193. Thus, the detection projection portion 131 that has passed through the detection opening 123 is not caught by the +X-side edge of the detection opening 123. The planar portion 193 is a plane provided between the slope portion 191 and the first output port 177 and parallel to an XY plane. The detection projection portion 131 transported from the slope portion 191 to the planar portion 193 is transported to the cartridge-side tape output port 121 with the detection end 137 being in contact with the planar portion 193.

The inner face, that is, the −Z-side face, of the first base wall 173 has a case step 194 between the contact portion 189 and the periphery of the first platen engaging hole 179. More specifically, the contact portion 189 is located to the −Z-side of the periphery of the first platen engaging hole 179.

The first tape-core shaft 195 and the guide portion 197 project in the −Z direction from the first base wall 173.

The first tape-core shaft 195 is inserted into the tape core 105. In other words, the first tape-core shaft 195 is provided coaxially with the second tape-core shaft 163.

The guide portion 197 is located to the +X-side of the platen roller 103 with the tape-like member 113 therebetween. As shown in FIG. 9, the guide portion 197 is provided at a position partially overlapping the pull-back preventing portion 167 when viewed from the +Z-side. The guide portion 197 is formed separately from the pull-back preventing portion 167.

As will be described in detail below, the guide portion 197 guides the feeding of the tape-like member 113 between the tape roll 115 and the platen roller 103.

The guide portion 197 includes the guide base end 199 and a guide distal end 201.

The guide base end 199 has a substantially semi-cylindrical shape and projects from the first base wall 173. More specifically, the section of the guide base end 199 taken along a plane parallel to an XY plane has a substantially semi-circular shape, and more specifically, a wing shape.

The guide base end 199 includes a first guide base-end face 203, a second guide base-end face 205, and a third guide base-end face 207 (shown in FIG. 9). The first guide base-end face 203 has a convex-arc shape curving toward the tape-like member 113 when viewed from the +Z-side and makes contact with the tape-like member 113. The second guide base-end face 205 has a planar shape and faces the ink ribbon 117. The third guide base-end face 207 has a concave-arc shape curving away from the tape roll 115 when viewed from the +Z-side and faces the tape roll 115. the third guide base-end face 207 has a concave-arc shape, the tape roll 115 does not interfere with the guide base end 199.

Figure 8:
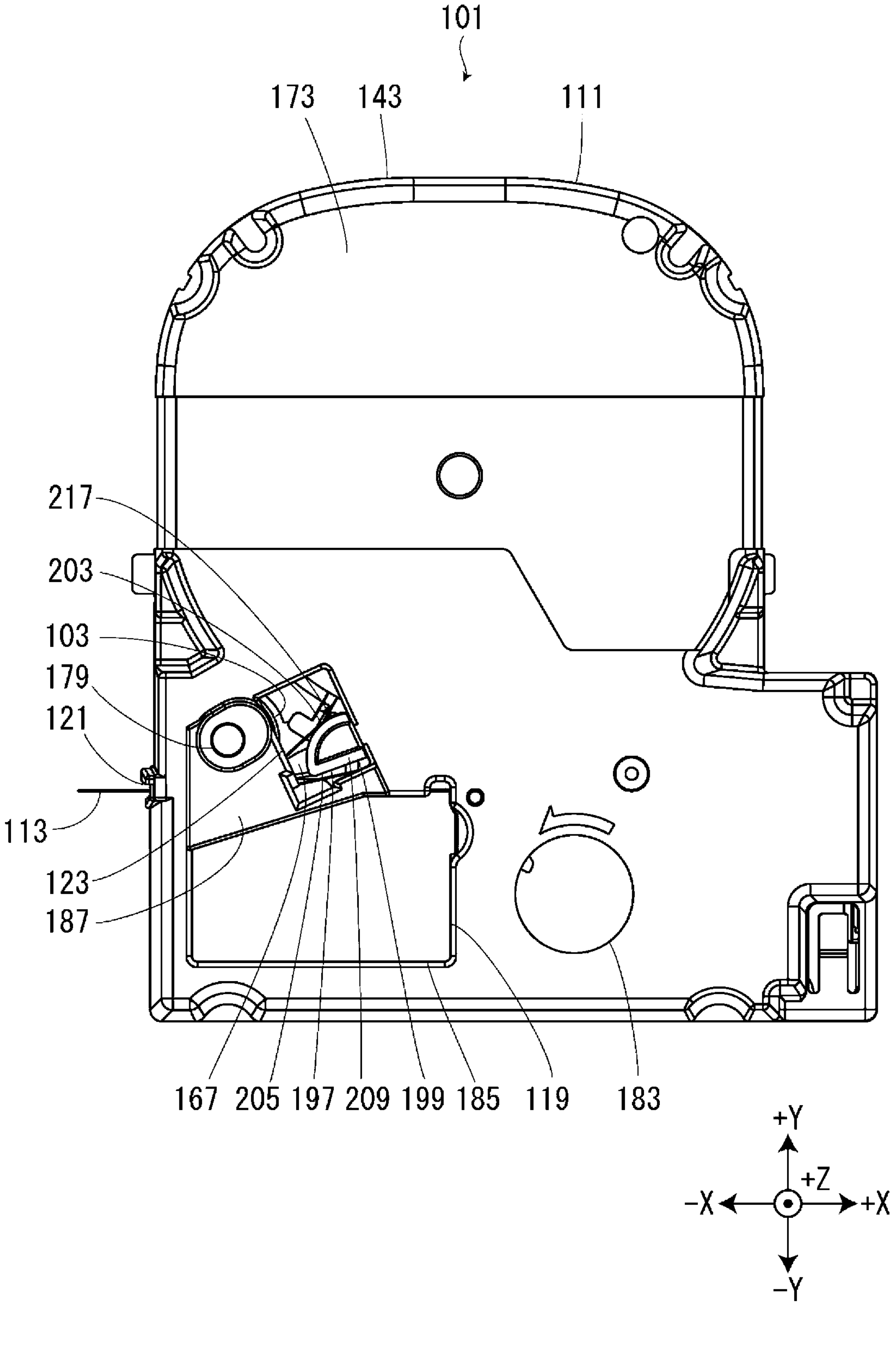
FIG. 8 shows the tape cartridge as viewed from the +Z side.

The guide base end 199 has a guide concave portion 209 curved in the −Z direction from the detection opening 123. As shown in FIG. 8, the guide concave portion 209 overlaps the detection opening 123 when viewed from the +Z-side. Because of the guide concave portion 209, the guide base end 199 does not interfere with the detecting portion 11 that has entered the detection opening 123 when the attaching-portion cover 5 is closed.

The guide distal end 201 projects in the −Z direction from the −Z-side face of the guide base end 199. The guide distal end 201 is provided to the +Y-side of the pull-back preventing portion 167. A guide engaging projection 211 is provided at the −Z-side end of the guide distal end 201. The guide engaging projection 211 is engaged with the guide engaging hole 161 provided in the second base wall 147. Hence, the guide portion 197 is supported at both ends by the first base wall 173 and the second base wall 147. Hence, the guide portion 197 is inhibited from being inclined due to the tension of the tape-like member 113.

The guide distal end 201 includes a first guide distal-end face 213 and a second guide distal-end face 215. The first guide distal-end face 213 has a convex-arc shape curving toward the tape-like member 113 when viewed from the +Z-side and makes contact with the tape-like member 113. More specifically, the first guide distal-end face 213 has a convex-arc shape continuous with the first guide base-end face 203. The second guide distal-end face 215 has a concave-arc shape curving away from the pull-back preventing portion 167 and faces the pull-back preventing portion 167.

The first guide distal-end face 213, which makes contact with the tape-like member 113, and the first guide base-end face 203 are collectively called a guide face 217. Desirably, the guide face 217 is rounded with a diameter of at least 8 mm. By setting so, the tape-like member 113 is not excessively bent at the guide portion 197. Hence, it is possible to inhibit the labels 125 from being partially peeled away from the liner tape 127 and to prevent crease-like folds, that is, separation folds, from being produced in the partially peeled-away portion.

The dimension of the guide distal end 201 in the Y axis is smaller than that of the guide base end 199. More specifically, as described above, although the first guide distal-end face 213 is continuous with the first guide base-end face 203, the second guide distal-end face 215 is located further to the +Y-side than the second guide base-end face 205. By setting so, the guide distal end 201 does not interfere with the pull-back preventing portion 167, which is provided to the −Y-side of the guide distal end 201. In other words, the guide distal end 201 is formed to be thinner than the guide base end 199 so as to avoid the interference with the pull-back preventing portion 167. As long as the guide portion 197 does not interfere with the pull-back preventing portion 167, the overall guide portion 197 may be formed in a substantially semi-cylindrical shape, instead of the structure as in this embodiment, in which the guide portion 197 has the substantially semi-cylindrical guide base end 199 and the guide distal end 201 that is thinner than the guide base end 199.

As shown in FIG. 9, the tape-like member 113 curves in a substantially "S" shape between the tape roll 115 and the cartridge-side tape output port 121 when viewed from the +Z-side. More specifically, the tape-like member 113 curves along the guide face 217 of the guide portion 197, more specifically, along the first guide base-end face 203 and the first guide distal-end face 213, such that the second tape side **113*b* is convex. The tape-like member 113 also curves along the peripheral surface of the platen roller 103 such that the first tape side 113*a* is convex. In this manner, the guide portion 197 allows the tape-like member 113 to curve along the peripheral surface of the guide portion 197 and guides the feeding of the tape-like member 113 such that the tape-like member 113 curves along the peripheral surface of the platen roller 103. Like this, by allowing the tape-like member 113 to continuously curve in different directions while being fed, the tape-like member 113 is kept stretched, and thus, bending of the tape-like member 113, including the detection projection portion 131**, is inhibited.

Figure 11:
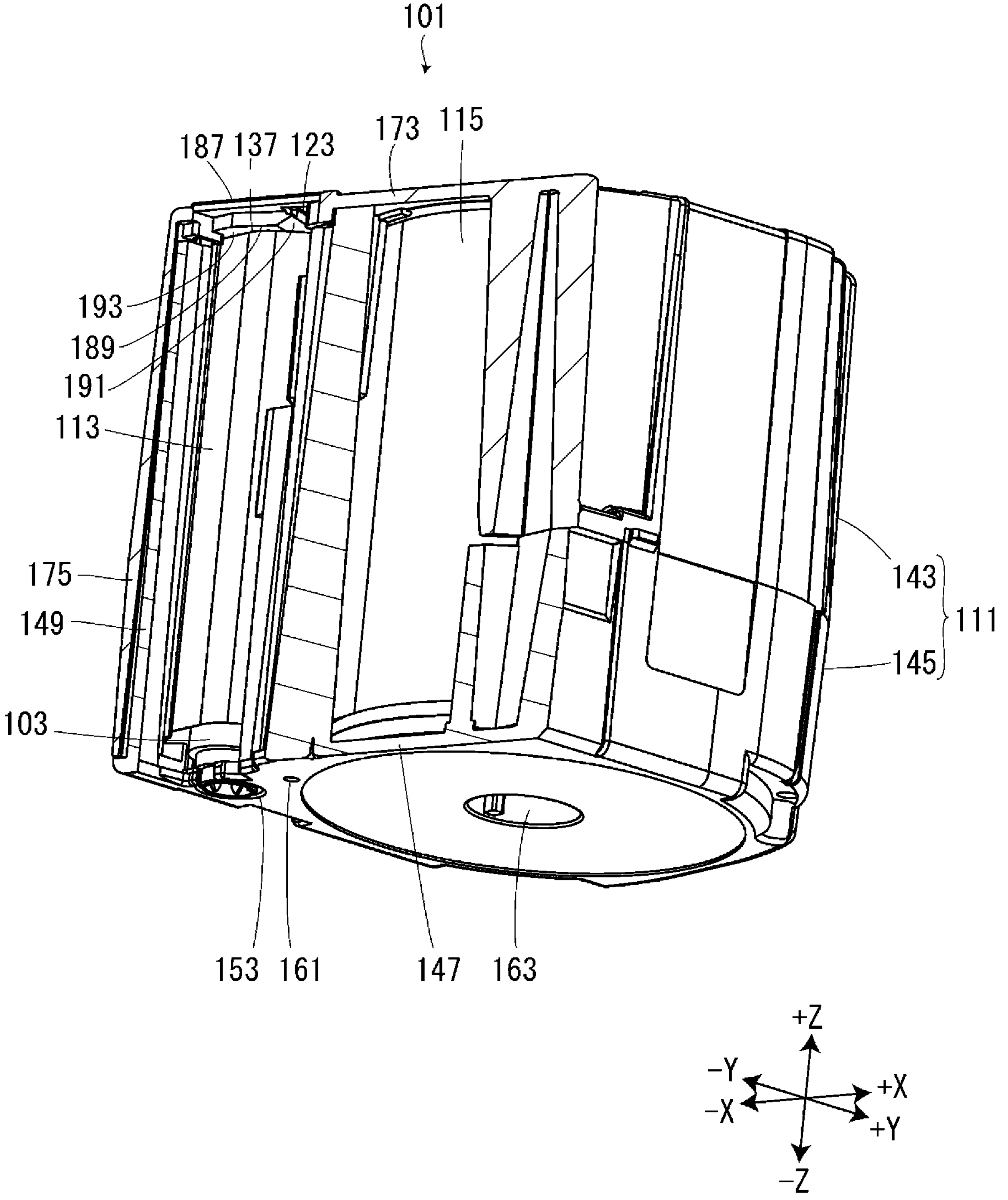
FIG. 11 is a sectional view of the tape cartridge, showing a state in which a detection end of a detection projection portion is in contact with a contact portion.

The contact portion 189 makes contact with a detection end 137 at a position where the tape-like member 113 curves along the peripheral surface of the platen roller 103 (see FIG. 11). More specifically, when a detection projection portion 131 passes through the platen roller 103, the detection end 137, which is the distal end of the detection projection portion 131, makes contact with the contact portion 189 in a state in which the detection projection portion 131 curves along the peripheral surface of the platen roller 103. Hence, the detection end 137 and the contact portion 189 make contact with each other at a portion where the tape-like member 113 curves along the peripheral surface of the platen roller 103 and thus has high strength against the compression load in the width direction of the tape-like member 113. Thus, the detection projection portion 131 is inhibited from being bent when the detection end 137 makes contact with the contact portion 189.

Figure 10:
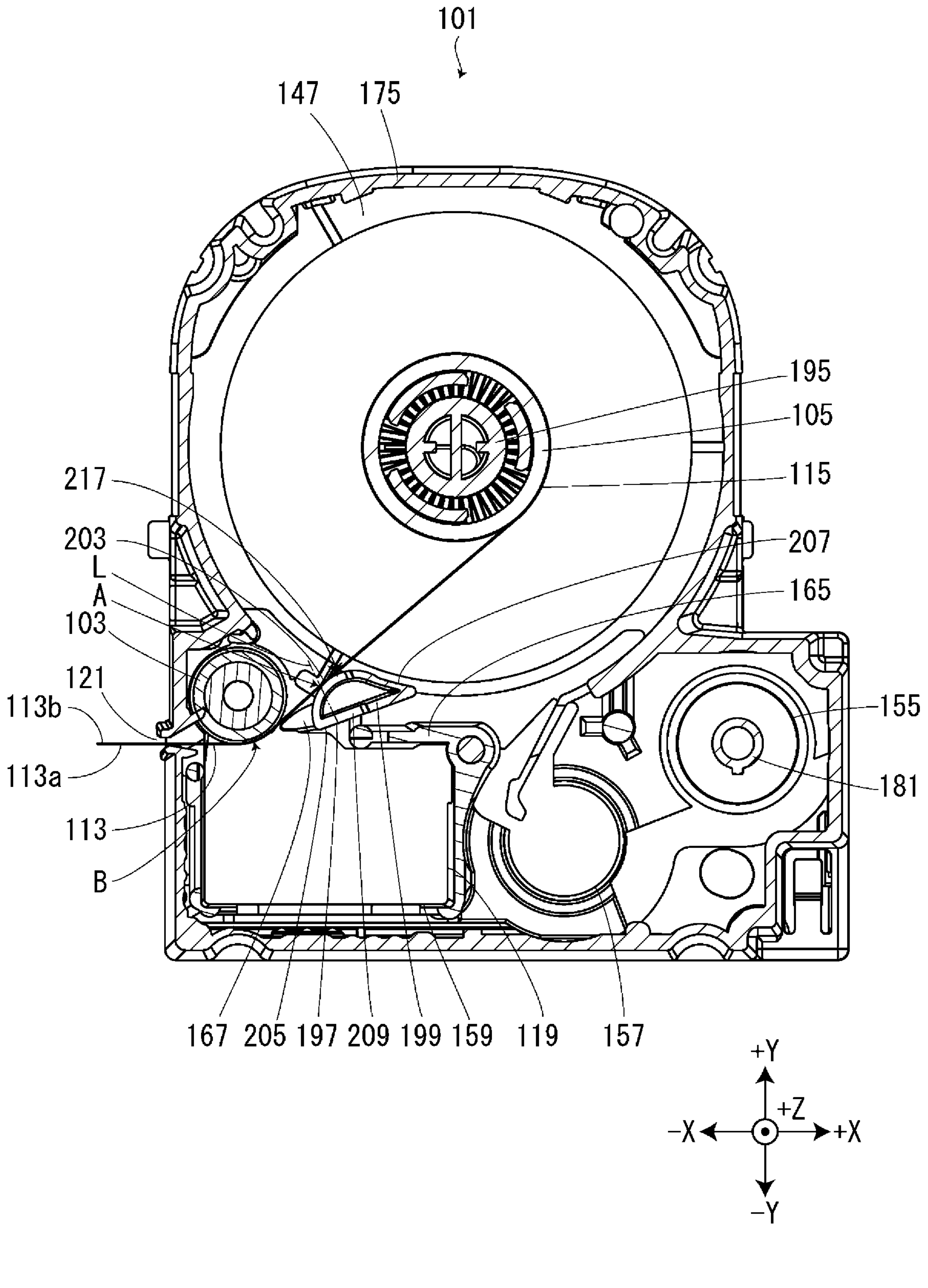
FIG. 10 is a sectional view of the tape cartridge taken at a plane parallel to an XY plane when the diameter of the tape roll is minimum.

The diameter of the tape roll 115 decreases as the tape-like member 113 is fed from the tape roll 115. The feed path for the tape-like member 113 between the tape roll 115 and the guide portion 197 when the diameter of the tape roll 115 is maximum, as shown in FIG. 9, differs from that when the diameter of the tape roll 115 is minimum, as shown in FIG. 10. A detecting position A, shown in FIGS. 9 and 10, is a position where the detecting portion 11 that has entered the detection opening 123 detects a detection projection portion 131. A virtual line L, shown in FIGS. 9 and 10, is a line connecting the light emitting element and the light receiving element of the detecting portion 11. The position where the virtual line L and the tape-like member 113 intersect each other is the detecting position A. A printing position B, shown in FIGS. 9 and 10, is a position where the thermal head 13 performs printing on a label 125.

Unlike the structure in this embodiment, in a structure in which the guide portion 197 makes contact with the tape-like member 113 at a position closer to the platen roller 103 than the detection opening 123 is when viewed from the +Z-side, the detecting position A varies with the diameter of the tape roll 115.

If the detecting position A varies with the diameter of the tape roll 115, the distance between the detecting position A and the printing position B also varies. As a result, the position of the printing image printed on the label 125 is also shifted in the length direction of the tape-like member 113 according to the diameter of the tape roll 115.

In contrast, in this embodiment, the guide portion 197 makes contact with the tape-like member 113 (see FIG. 8) at a position overlapping the detection opening 123 when viewed from the +Z-side. Furthermore, the guide face 217, that is, the first guide distal-end face 213 and the first guide base-end face 203, is rounded with a diameter of at least 8 mm. This structure inhibits the detecting position A, where the detecting portion 11 that has entered the detection opening 123 performs detection, from varying with the diameter of the tape roll 115. Hence, the variation in distance between the detecting position A and the printing position B with the diameter of the tape roll 115 is also prevented. Thus, shifting of the position of the printing image printed on the label 125 in the length direction of the tape-like member 113 according to the diameter of the tape roll 115 is inhibited.

As described above, with the tape cartridge 101 according to this embodiment, because the contact portion 189, which makes contact with a detection end 137, is provided at a position where the tape-like member 113 curves along the peripheral surface of the platen roller 103, the detection end 137 makes contact with the contact portion 189 at a portion where the strength of the tape-like member 113 against the compression load in the width direction of the tape-like member 113 is high. Thus, the detection projection portion 131 is inhibited from being bent when the detection end 137 makes contact with the contact portion 189.

Second Embodiment

Figure 12:
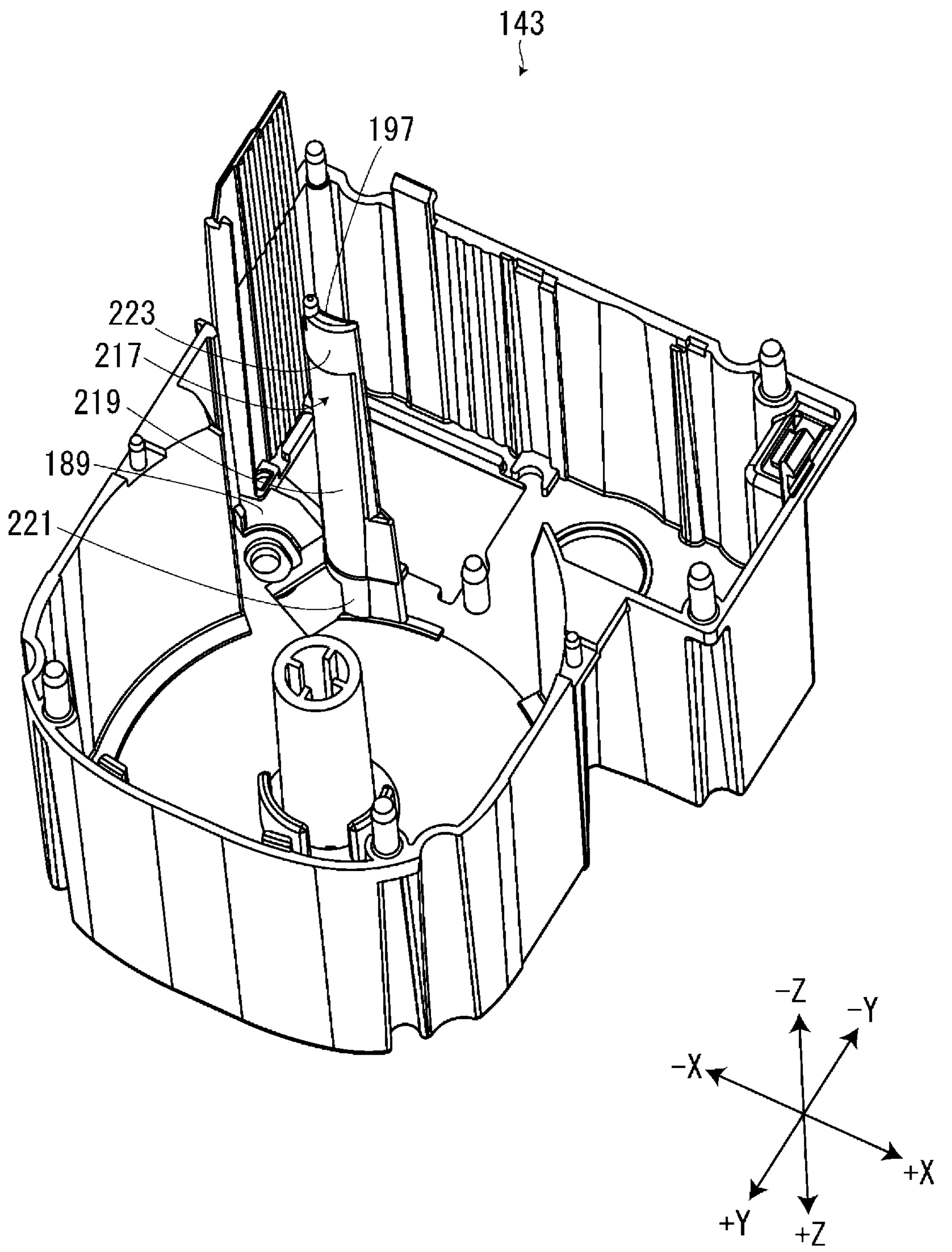
FIG. 12 is a perspective view of a first case of a tape cartridge according to a second embodiment.
Figure 13:
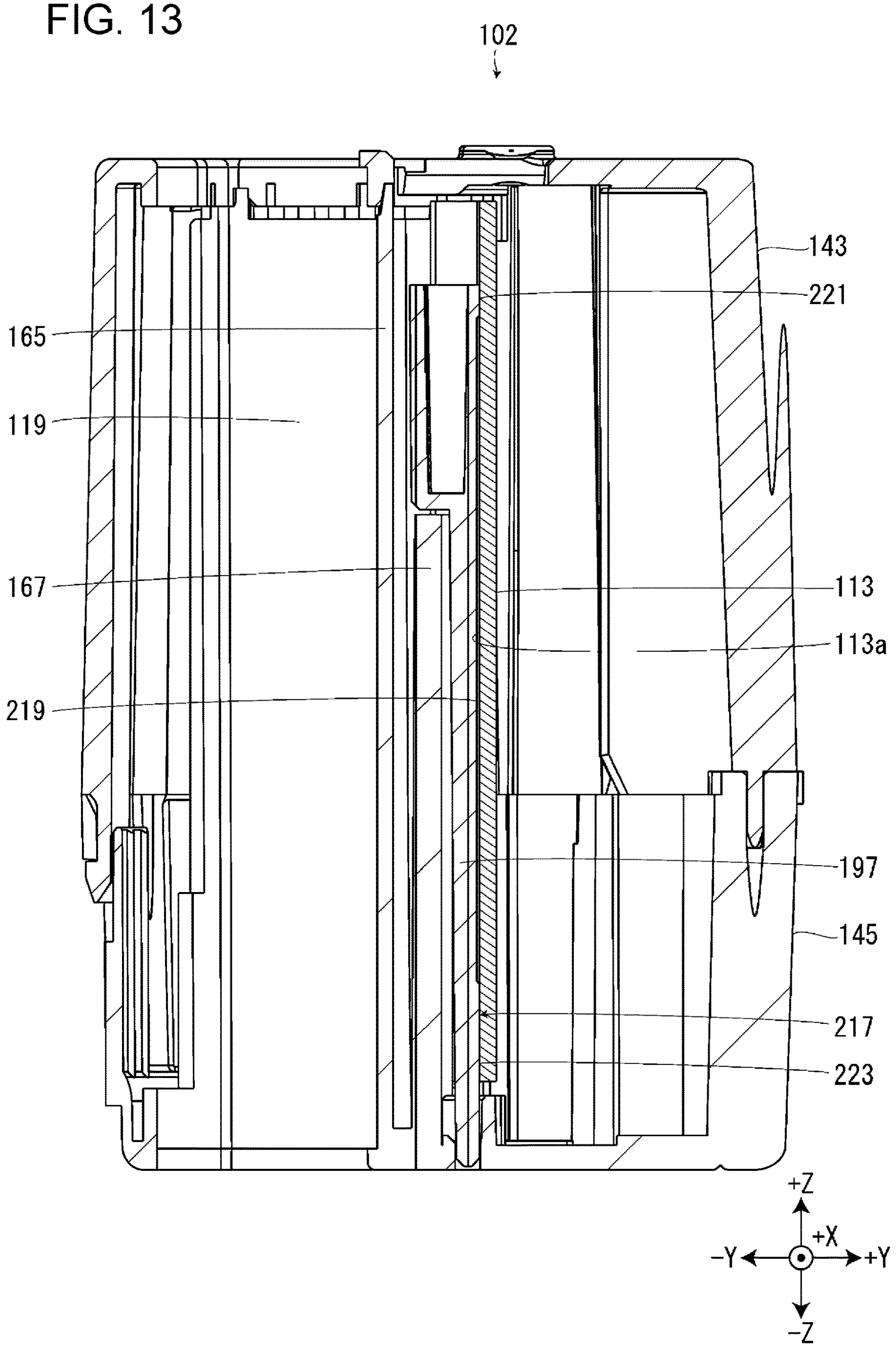
FIG. 13 is a sectional view of the tape cartridge.
Figure 14:
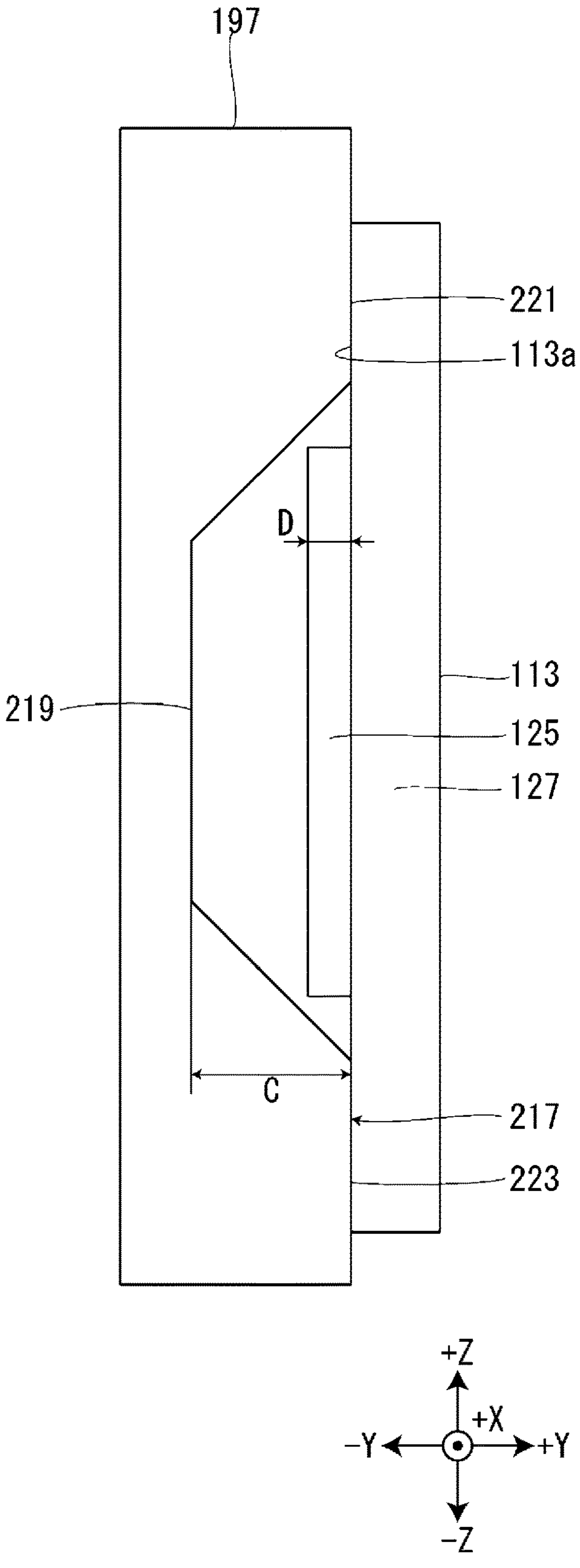
FIG. 14 schematically shows a guide portion and a tape-like member.

Next, a tape cartridge 102, which is a second embodiment of the tape cartridge, will be described. As shown in FIGS. 12 to 14, the tape cartridge 102 according to the second embodiment has substantially the same structure as the tape cartridge 101 according to the first embodiment, except that the guide face 217 to be in contact with the tape-like member 113 has a label corresponding recess 219. In the guide face 217, a portion to the +Z-side of the label corresponding recess 219 is called a first guide face 221, and a portion to the −Z-side of the label corresponding recess 219 is called a second guide face 223. In other words, the label corresponding recess 219 is provided between the first guide face 221 and the second guide face 223.

The label corresponding recess 219 is provided in the guide face 217, at a position corresponding to a label 125 on the tape-like member 113. This means that, when the tape-like member 113 is fed, the label 125 passes through the label corresponding recess 219 without touching the first guide face 221 or the second guide face 223, as shown in FIG. 14. The label corresponding recess 219 is recessed with respect to the first guide face 221 and the second guide face 223. The depth C of the label corresponding recess 219 is larger than the thickness D of the label 125 and is, for example, 0.3 mm. Thus, the label 125 does not touch the inner face of the label corresponding recess 219 when the tape-like member 113 is fed.

Because the guide face 217 has the label corresponding recess 219, the label 125 is not rubbed by the guide face 217 when the tape-like member 113 is fed. Thus, the label 125 is prevented from being peeled off from the liner tape 127. When adhesive is applied only to a limited area of each label 125, compared with a case where the adhesive is applied to the overall area thereof, the label 125 is more likely to be peeled off from the liner tape 127 when the label 125 is rubbed. Hence, the structure according to the second embodiment is particularly effective.

In contrast, in the first tape side 113*a* of the liner tape 127, the portions other than the label 125 make contact with the first guide face 221 and the second guide face 223 when the tape-like member 113 is fed. Thus, as in the first embodiment, the guide portion 197 guides the feeding of the tape-like member 113 such that the tape-like member 113 curves along the peripheral surface of the platen roller 103. Hence, bending of the detection projection portion 131 is inhibited.

As described above, with the tape cartridge 102 according to the second embodiment, because the guide face 217 has the label corresponding recess 219, it is possible to inhibit the label 125 from being peeled off from the liner tape 127 while inhibiting the detection projection portion 131 from being bent.

Other Modifications

It is of course to be understood that the present disclosure is not limited to the above-described embodiments, but may be variously modified within the scope not departing from the spirit thereof. For example, the above-described embodiments may be modified as below. The embodiments and modifications may be combined.

The guide portion 197 does not necessarily have to be provided on the first case 143, but may be provided on the second case 145. In that case, the guide portion 197 may be supported at both ends by the first base wall 173 and the second base wall 147. More specifically, the guide portion 197 projecting from the second base wall 147 may be engaged with the first base wall 173. Furthermore, the guide portion 197 may include a first guide portion provided on the first case 143, and a second guide portion provided on the second case 145.

The guide portion 197 does not necessarily have to be formed separately from the pull-back preventing portion 167, but may be integrated with the pull-back preventing portion 167. More specifically, a single projection provided on the first case 143 or the second case 145 may serve as the guide portion 197 and the pull-back preventing portion 167.

The tape cartridge 101 does not necessarily have to have the platen roller 103. For example, the platen roller 103 may be attached to the tape printing device 1 separately from the tape cartridge 101 or may be preliminarily provided on the tape printing device 1. The ink ribbon 117 does not necessarily have to be accommodated in the tape cartridge 101. For example, the ink ribbon 117 may be accommodated in a ribbon cartridge that is different from the tape cartridge 101. The tape cartridge 101 may use, for example, thermal paper as the tape-like member 113 to enable printing on the tape-like member 113 without using the ink ribbon 117.

Additional Description

The tape cartridge will be additionally described.

A tape cartridge to be attached to a tape printing device having a detecting portion includes: a tape-like member including a tape body having a first edge located in a first direction, which is one side in a width direction of the tape body, and a detection projection portion projecting in the first direction from the first edge so as to be detected by the detecting portion and having a detection end at an end thereof in the first direction; a guide portion that guides feeding of the tape-like member such that the tape-like member curves along a peripheral surface of a platen roller for feeding the tape-like member; and a contact portion that makes contact with the detection end at a position where the tape-like member curves along the peripheral surface of the platen roller.

With this structure, because the contact portion is provided, which makes contact with the detection end at a position where the tape-like member curves along the peripheral surface of the platen roller, the detection end makes contact with the contact portion at a portion where the strength of the tape-like member against the compression load in the width direction of the tape-like member is high. Hence, bending of the detection projection portion when the detection end makes contact with the contact portion is inhibited.

Note that the +Z direction is an example of the "first direction".

In this case, the tape cartridge may further include a cartridge case accommodating the tape-like member and including a first wall and a second wall, which is provided in a second direction with respect to the first wall, the second direction being opposite to the first direction. The guide portion may be supported at both ends by the first wall and the second wall.

This structure inhibits the guide portion from being inclined due to the tension of the tape-like member.

The first base wall 173 is an example of the "first wall". The second base wall 147 is an example of the "second wall". The −Z direction is an example of the "second direction".

In this case, the tape cartridge may further include a platen roller rotatably accommodated in the cartridge case. The cartridge case may have a pull-back preventing portion that nips the tape-like member between itself and the platen roller to prevent the tape-like member from being pulled back into the cartridge case, and the guide portion may be formed separately from the pull-back preventing portion.

With this structure, the guide portion inhibits bending of the detection projection portion, and the pull-back preventing portion prevents the tape-like member from being pulled back into the cartridge case.

In this case, the tape-like member may curve along a guide face of the guide portion such that one face thereof projects outward and may curve along a peripheral surface of the platen roller such that the other face thereof projects outward.

This structure allows the tape-like member to curve in a substantially "S" shape.

In this case, the guide face may be rounded with a diameter of at least 8 mm.

This structure inhibits the detecting position with the detecting portion from varying with the diameter of the tape roll.

In this case, the tape-like member may include a liner tape having a first tape side to be in contact with a guide face of the guide portion and a label stuck to the first tape side of the liner tape. The guide face may have a label corresponding recess at a position corresponding to the label.

This structure inhibits the label from touching the guide face. Hence, it is possible to inhibit the label from being peeled off from the liner tape while inhibiting the detection projection portion from being bent.

In this case, the tape cartridge may further include a cartridge case accommodating a tape roll formed by winding the tape-like member in a roll shape. The cartridge case may have a detection opening in which the detecting portion is positioned when the tape cartridge is attached to the tape printing device. The guide portion may make contact with the tape-like member at a position overlapping the detection opening when viewed from the first direction.

This structure inhibits the detecting position with the detecting portion positioned in the detection opening from varying with the diameter of the tape roll.

What is claimed is:

1. A tape cartridge to be attached to a tape printing device having a detecting portion, the tape cartridge comprising:
- a tape-like member including
  - a tape body having a first edge located in a first direction, which is one side in a width direction of the tape body, and
  - a detection projection portion projecting in the first direction from the first edge so as to be detected by the detecting portion and having a detection end at an end thereof in the first direction;
- a guide portion that guides feeding of the tape-like member such that the tape-like member curves along a peripheral surface of a platen roller for feeding the tape-like member; and
- a contact portion that makes contact with the detection end when the tape-like member is convex outwardly from the platen roller at a position where the tape-like member curves along the peripheral surface of the platen roller.

2. The tape cartridge according to claim 1, further comprising a cartridge case accommodating the tape-like member and including
- a first wall and
- a second wall, which is provided in a second direction with respect to the first wall, the second direction being opposite to the first direction, wherein
- the guide portion is supported at both ends by the first wall and the second wall.

3. The tape cartridge according to claim 2, wherein
- the platen roller is rotatably accommodated in the cartridge case,
- the cartridge case has a pull-back preventing portion that nips the tape-like member between itself and the platen roller to prevent the tape-like member from being pulled back into the cartridge case, and
- the guide portion is formed separately from the pull-back preventing portion.

4. The tape cartridge according to claim 1, wherein
- the tape-like member curves along a guide face of the guide portion such that one face thereof projects outward and curves along a peripheral surface of the platen roller such that the other face thereof projects outward.

5. The tape cartridge according to claim 4, wherein
- the guide face is rounded with a diameter of at least 8 mm.

6. The tape cartridge according to claim 1, wherein
- the tape-like member includes
  - a liner tape having a first tape side to be in contact with a guide face of the guide portion and
  - a label stuck to the first tape side of the liner tape, wherein
- the guide face has a label corresponding recess at a position corresponding to the label.

7. The tape cartridge according to claim 1, further comprising a cartridge case accommodating a tape roll formed by winding the tape-like member in a roll shape, wherein
- the cartridge case has a detection opening in which the detecting portion is positioned when the tape cartridge is attached to the tape printing device, and the guide portion makes contact with the tape-like member at a position overlapping the detection opening when viewed from the first direction.

* * * * *